United States Patent [19]

Clarke

[11] Patent Number: 4,790,654
[45] Date of Patent: Dec. 13, 1988

[54] SPECTRAL FILTER

[75] Inventor: Stanley P. Clarke, Rancho Palos Verdes, Calif.

[73] Assignee: TRW Inc., Redondo Beach, Calif.

[21] Appl. No.: 74,812

[22] Filed: Jul. 17, 1987

[51] Int. Cl.⁴ ............................................... G01J 3/02
[52] U.S. Cl. .................................. 356/310; 356/326; 356/330
[58] Field of Search ............... 356/300, 310, 326, 328, 356/330–334, 402; 350/162.11, 162.17, 162.23, 168

[56] References Cited

U.S. PATENT DOCUMENTS 4,615,619 10/1986 Fateley ................................. 356/310
4,705,396 11/1987 Bergström ........................... 356/334

FOREIGN PATENT DOCUMENTS 1076393 7/1967 United Kingdom ........... 356/162.23

OTHER PUBLICATIONS

Young, *IBM Technical Disclosure Bulletin*, vol. 8, No. 1, Jun. 1965, pp. 111 and 112.

*Primary Examiner*—F. L. Evans
*Attorney, Agent, or Firm*—Ronald M. Goldman; Sol L. Goldstein

[57] ABSTRACT

Within a surveillance system there is included optical processor means for receiving a multispectral light image at an input and providing a spectrally modified image at an output, which comprises: an input means for receiving a light image; light dispersing means coupled to said input means for dispersing said received image into a constituent plurality or spectral components and distributing said plurality of spectral components over a predetermined area; means located in said area responsive to said spectral components located in said space for modifying at least one of said spectral components and for reflecting said spectral components, including modified spectral components, to a common plane in essentially overlapping registered relationship to reconstitute a multispectral image of different spectral content so as to eliminate clutter from within the image. Other disclosed systems provide for communications and color matching.

21 Claims, 3 Drawing Sheets

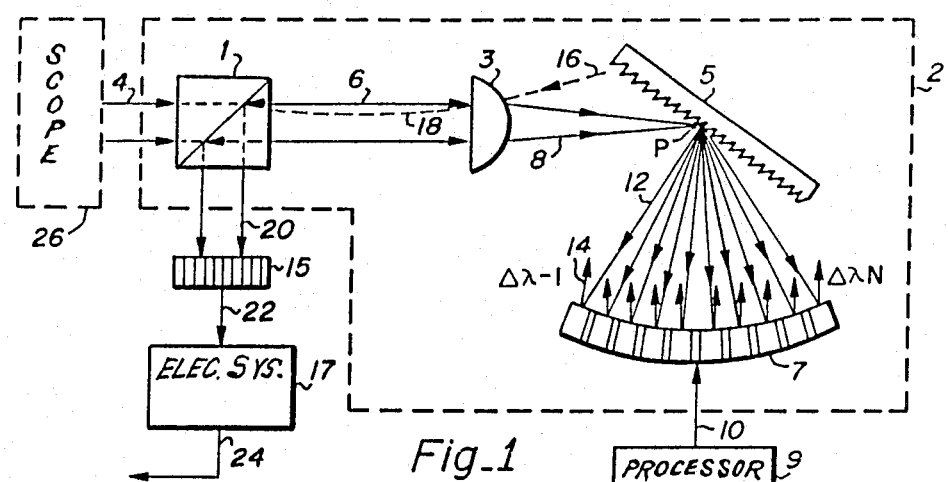
Fig_1
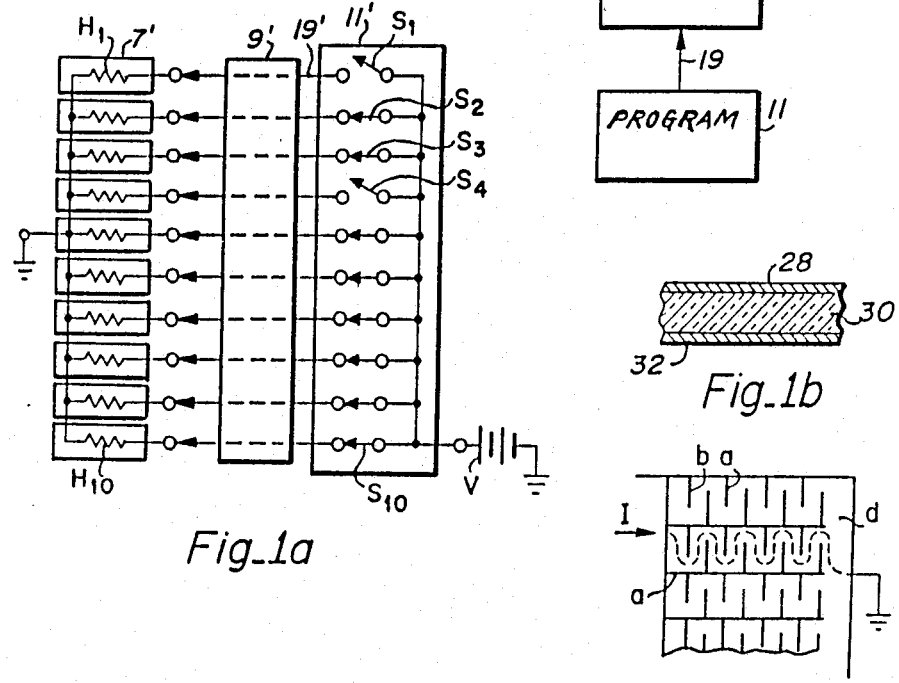
Fig_1a
Fig_1b
Fig_1c
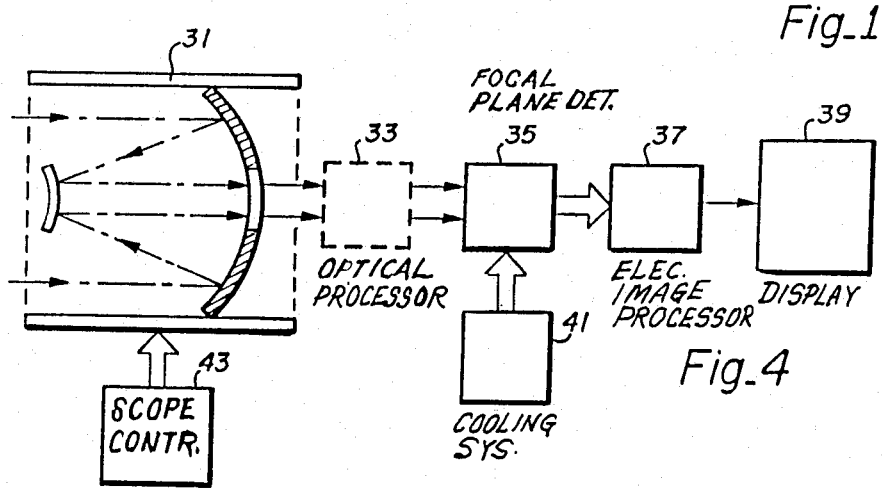
Fig_4

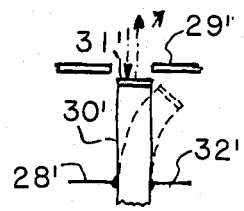
Fig_1d
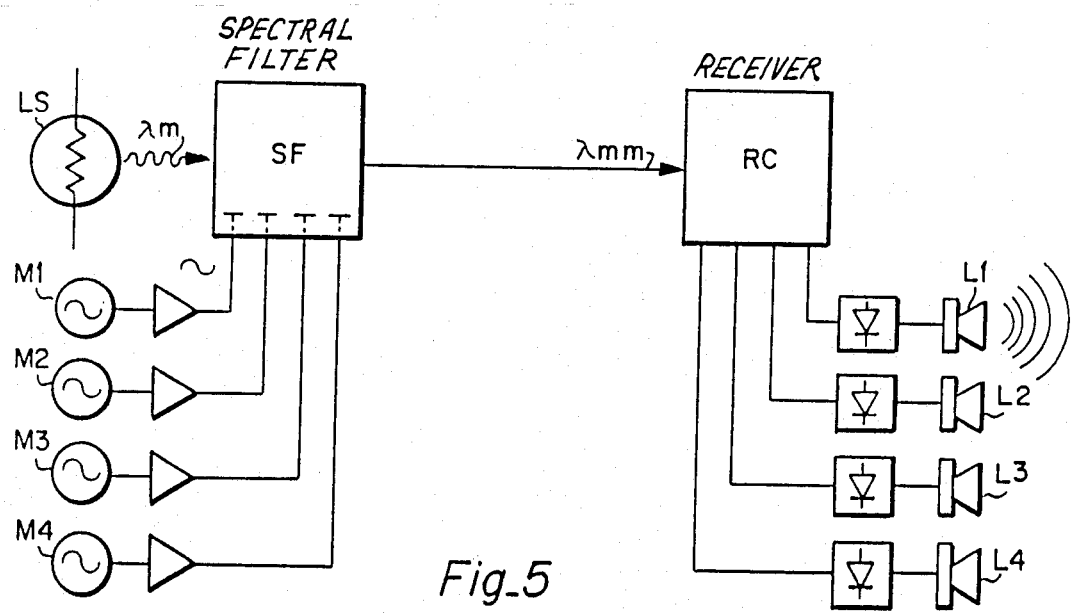
Fig_5
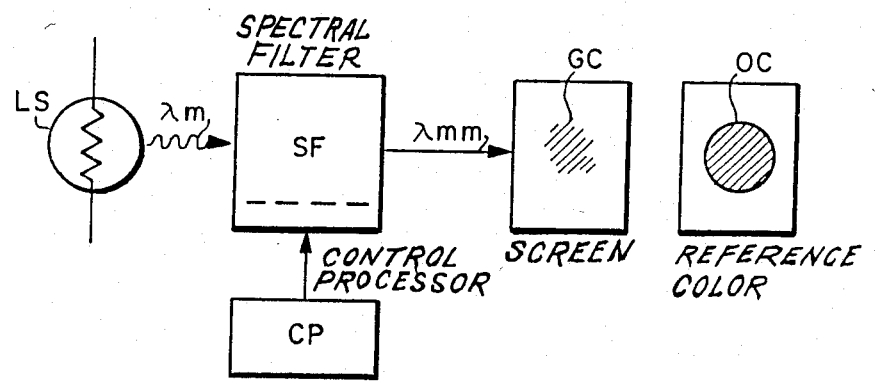
Fig_6

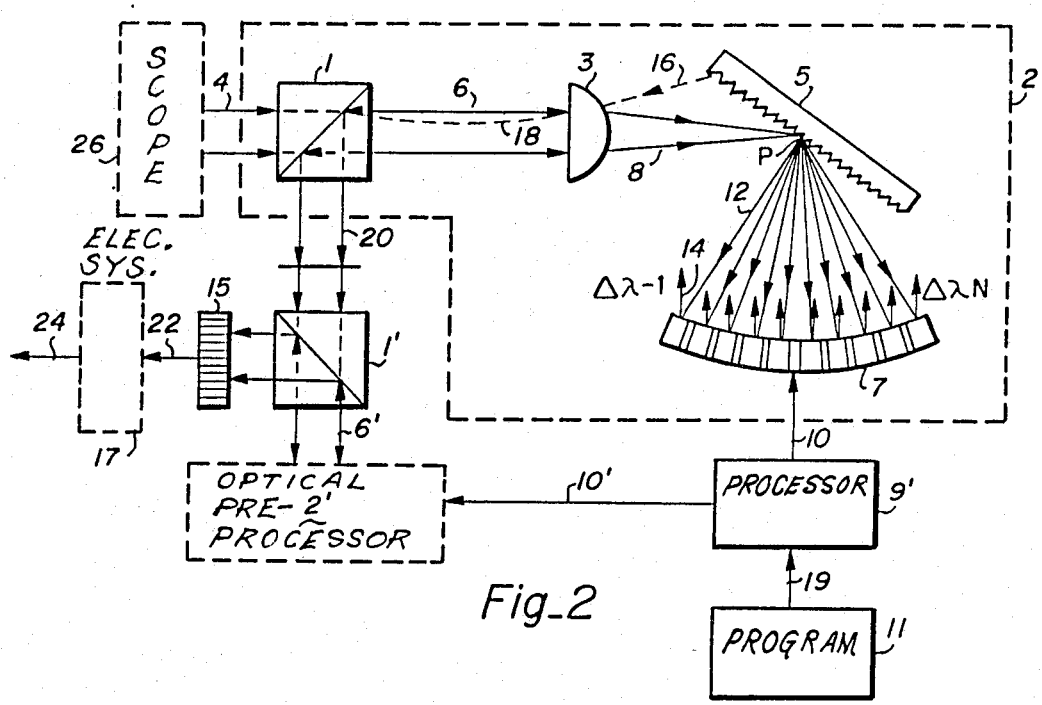
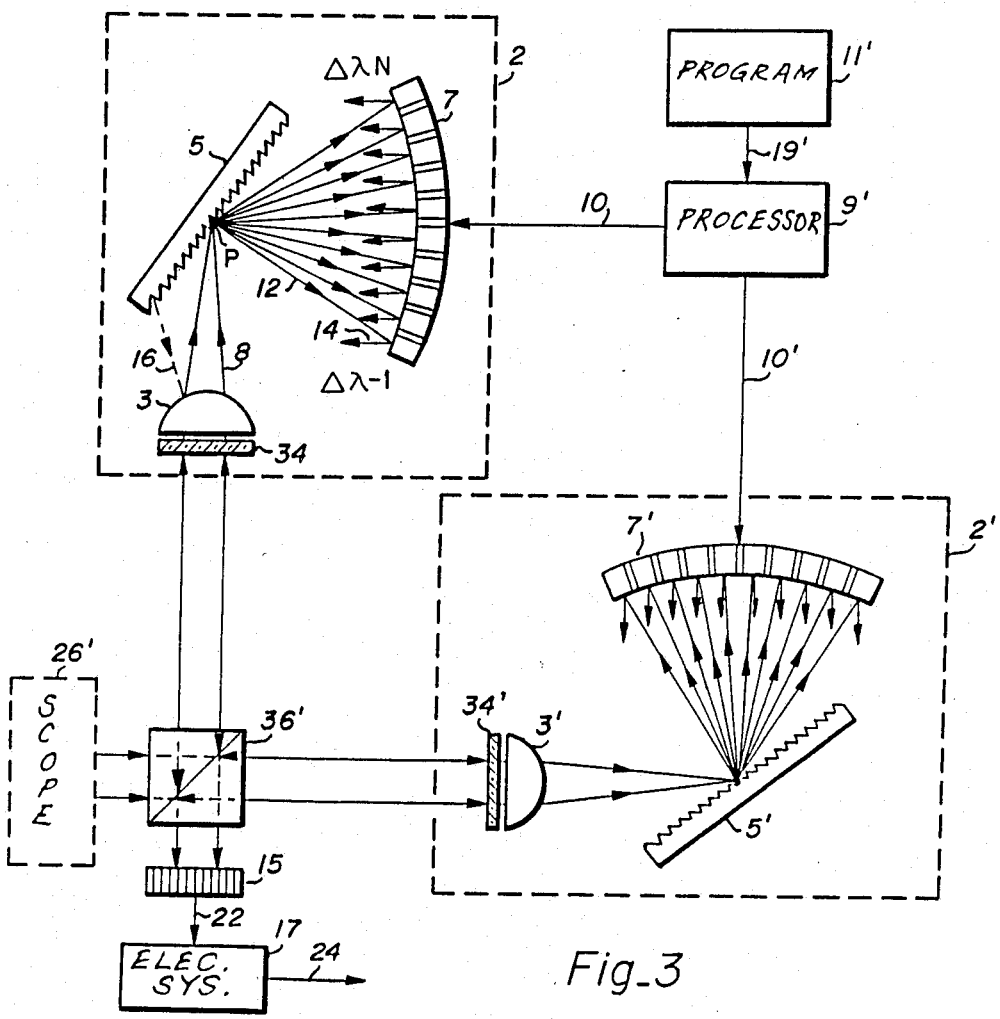
Fig_2
Fig_3

SPECTRAL FILTER

FIELD OF THE INVENTION

This invention relates to spectral filters and, more particularly, to object surveillance and communication systems employing spectral filters. The invention also relates to an optical preprocessor for use in a clutter rejecting image processing system in which color is a distinguishing characteristic of the clutter.

BACKGROUND

Color plays an important role in all aspects of daily life, including a role in the identification of persons and things. One picks out the black haired lady in the red dress or the brown haired man wearing a blue suit from a crowd of people. Color serves also to communicate other information. The traffic signal provides a light to let one know whether to proceed, stop or prepare to stop with green, red and yellow illumination, respectively, the colors of which are obtained by inserting appropriate color filters in front of a multispectral light source, such as a white light. The red filter blocks the passage of all spectral components, except the red; the green filter blocks all spectral components, except green; and the yellow filter allows passage only of the yellow spectral component.

The illumination from colored lights provide a mood or ambience in theaters: The stage lights are adjusted to provide a light of a color that sets the mood or appearance desired by the playwright or to spot light a particular player on the stage. Color has application in the more esoteric fields, such as in identifying materials and gases by measuring the spectral absorption characteristics and comparing those to absorption characteristics of known materials and gases, a process referred to as "spectroscopy" and such as in electronic surveillance systems, in which the color of an object determines whether the object is one that is important or unimportant.

Electronic surveillance systems provide the means to monitor and display a field of view or scene that is placed under surveillance. The lay person is familiar with television cameras used by security forces to monitor and display secured areas and detect intrusion: Modern radar systems are used to provide general surveillance of the heavens for commercial purposes, such as in tracking commercial airplanes flying into and out of airports, and for military purposes, such as detecting and tracking war planes and, more importantly, the deadly self-guided missiles.

A common problem to all electronic surveillance systems is to separate the "clutter", those images representing static objects or even moving objects which, though in the field of view, are of no concern, from the target image or targets, which is the purpose of the surveillance. One may thus concentrate attention on the target. This known problem has been addressed in a combination of ways: by devising means to enhance the image of the desired target; to eliminate the "clutter"; and a combination of the two.

In critical military radar systems, achieving satisfactory clutter elimination is complicated many fold by the fact that the clutter itself in the field of view is moving and is numerous. For example, the reader may be familiar with newspaper articles that describe military threats posed by strategic attack missile systems, which includes the armed missile and decoys. The decoys are themselves missiles that are unarmed. In a hypothetical military threat, a large number of missiles are in effect "rained" upon a target location, only a few of which are armed. In a hypothetical countermeasure to this threat, a missile is to be used to shoot down the armed intruder. The object is to use the limited anti-missile resources available to shoot only at the live armed missile in an attempt to shoot the attacking missile down before it can do its deadly work. The numerous decoys serve as a device distracting the defenders from the real threat to their lives. Clutter rejection systems thus attempt to implement the 18th century command "Don't Shoot Before You Can See the Whites of Their Eyes", in a 20th century context. Although means exist to allow military defenders to detect which missile is armed and which is the decoy, the details of those "footprints" or "signatures" are not relevant to the description of the present invention and need not be addressed, except in the context they share with other kinds of clutter, both dynamic and static; that characteristic is spectral, the color associated with the object.

By way of example, one may consider an image in which a decoy missile is colored red, while the true armed missile appearing in the same field of view, is represented in the color blue. By filtering out the red as unimportant or "clutter", the position and movement of that armed missle may be viewed without distraction and the defenders guns may be properly aimed.

Digital computers have been used to acquire track surveillance information and to enhance the display by electronically eliminating the display of unwanted objects. However, as the amount of such clutter and its movement in the field of view increases, the processing capabilities of computers must be increased, requiring more expensive and faster computers with greater memory. Situations are foreseeable in which existing computers may be insufficient as a practical matter to handle a scene containing hundreds of unwanted moving objects. An advantage of the invention is that a great deal of the clean up work in this environment is handled optically. This reduces the amount of information that the main computer is called upon to handle.

A form of spectral preprocessing is known. In this various color filters are mounted on a wheel that is rotated at high speed so as to take rapid consequtive snap shots of the field of view as perceived in separate colors. The wheels rotation is synchronized with associated electronic cameras, such as a video camera so that the individual snap shots are taken, digitized and stored in an associated computer where the information is acted upon. This mechanical flying spot scanner type of device is obviously limited to a small number of possible filters and in a sense offers little benefit in reducing computer needs in fields under surveillance containing large amounts of moving clutter. An advantage of the present invention is that the color filtering combinations appear to be virtually unlimited.

An object of the invention is to provide an optical preprocessor to modify the spectral content of a received image. A further object is to provide a preprocessor system to optically remove clutter from received images in electronic surveillance systems. A still further object of the invention is the provision in a spectral modifying device of a novel mirror having controllable reflectivity and to provide multispectral light systems having means using controlled reflectivity mirrors for providing measurement, detection, and communications.

SUMMARY

The invention provides for the spectral modification of received multispectral illumination, particularly in the form of an image. It includes an input means for receiving multispectral image; means coupled to said input means for dispersing said received multispectral image into a constituent plurality of spectral components and spatially distributing said plurality of spectral components over a predetermined area; means located in said area responsive to said spectral components located in said space for modifying at least one of said spectral components and for reflecting said spectral components, including modified spectral components, to a common plane in essentially overlapping registered relationship to reconstitute a multispectral image; and output means for outputting said reconstituted image from said common plane.

In one detailed aspect of invention the modifying means includes a multi-segment mirror having a controlled reflectivity characteristic and means for controlling the reflectivity characteristic of the individual mirror segments. In a still more detailed aspect the mirrors are characterized as a layer of material of the class of compounds containing oxides of vanadium or titanium, which has a temperature dependant reflectivity characteristic and in which the control means provides current to heat the material.

The control means in another detailed aspect comprises a program having a prestored spectral characterization or one which is inserted in essentially real time, as with a training procedure; and may alternatively be a modulator or series of modulators.

The foregoing objects and advantages of the invention together with the structure characteristic thereof, which was only briefly summarized in the foregoing passages, becomes more apparent to those skilled in the art upon reading the detailed description of a preferred embodiment which follows in this specification, taken together with the illustration thereof presented in the accompanying drawings.

BRIEF DESCRIPTION OF THE DRAWINGS

In the drawings:

FIG. 1 illustrates in symbolic form an embodiment of the invention;

FIG. 1a is a partial schematic illustration of certain elements of the embodiment of FIG. 1;

FIG. 1b is a partial section view of an element of the embodiment of FIG. 1;

FIG. 1c is a partial illustration of a heater element used in the embodiment of FIG. 1;

FIG. 1d is a partial view of an alternative element used in the embodiment of FIG. 1;

FIG. 2 illustrates in symbolic form an embodiment of the invention capable of spectral filtering along two axes of an image;

FIG. 3 illustrates in symbolic form an embodiment which incorporates polarization filtering;

FIG. 4 is a block diagram of a surveillance system incorporating the optical spectral preprocessor;

FIG. 5 illustrates in block diagram form a communication system according to the invention; and FIG. 6 illustrates in block diagram form a controlled lighting source made according to the invention.

DESCRIPTION OF THE PREFERRED EMBODIMENT

The optical spectral pre-processor is illustrated in symbolic form in FIG. 1. The pre-processor is generally represented by dash lines 2 and includes a beam splitter 1, which serves as a light input and output device. In its preferred form the splitter is a one-half silvered mirror, well known in the optical art. The processor further includes a cylindrical lens 3, a planar diffraction grating 5 and a segmented concavely curved mirror 7, having individual segments arranged side by side. A control processor 9 is connected to mirror 7 as represented at 10. As is described in greater detail hereinafter, the processor is coupled to a program device 11, which in some embodiments is a computer program. As illustrated, the cylindrical lens is oriented so as to receive multispectral light, an image, as represented by the lines 6 passed by splitter 1. Diffraction grating 5 is oriented at the focal point of lens 3. In turn, mirror 7 is oriented to intercept light dispersed by diffraction grating 5 and to reflect that light back to the grating. For completeness, a focal plane array 15 is illustrated and has an output 22 coupled to an electronic system, represented at 17, which in turn outputs via lead 24 to other equipment, not illustrated or described in connection with this figure.

In operation, an image as represented by lines 4, obtained from a telescope or other means as represented in dash lines 26, is passed to the input end of beam splitter 1. That image is passed as represented at 6 by the beam splitter to cylindrical lens 3, which focuses the image as indicated by lines 8 into a narrow vertical line, orthogonal to the plane of the figure, represented in the figure by a point, P, at planar diffraction grating 5. The diffraction grating disperses the light into its many spectral components as represented by lines 12 and sends that light to the area occupied by the mirror. These spectral components may range from the infrared, at the lower end of the visible light spectrum, to ultraviolet at the upper end of the visible light spectrum, depending upon the performance passband of the optical components selected, with all the yellows, reds, and greens in between. The grating spatially distributes those spectral components over the surface area occupied by the segmented mirrors and is incident upon those mirrors.

The mirror segments at the right end in the figure receive the spectral component of the image that are in the ultraviolet range, the mirror segment at the left end receives a spectral component representing the infrared range and the segments in between obtain the spectral components representing the colors in between, ranging from red to yellow. In effect, each mirror segment receives a "clone" of the spectral components of the received image as dispersed at the angle from the plane of the diffraction grating. This dispersion occurs much like the dispersal of white light focused onto a glass prism that breaks out a rainbow of colors. The light is dispersed into a spatially arranged sequence of colors representing the rainbow. As those skilled in the art recognize, a prism may be substituted for the grating in the combination. The grating is, however, preferred; it has less losses and does not attenuate incident light to the same degree inherent in a glass prism. In other embodiment where attenuation is not a concern, the prism may be substituted.

Each of the mirrors has a controlled reflectivity characteristic. As with any mirror, the light reflected from the surface is slightly attenuated from the level incident upon the surface. This is caused by imperfections in the surface coating of the mirror. The ratio of the reflected light level to the incident light level is a measure of the ability of the reflective surface to reflect the light, referred to as the reflectivity characteristic. As further described hereinafter, the reflectivity characteristic of each of the segments is controlled by processor 9.

Continuing with the description of the path taken by the incident light, each mirror segment reflects the incident light component, represented at 14, over the entire surface of the diffraction grating. In turn, the diffraction grating bends each incident spectral color by a different amount so as to bring them into superposition in a single line, orthogonal to the plane of the paper, at the focus of cylindrical lens 3. The grating thus directs the light to the left in the figure, represented at 16, where it is incident upon the cylindrical surface of cylindrical lens 3. The cylindrical lens expands or enlarges these lines or bands of light, into a wide area. The lens accomplishes precisely the reverse action to that which occurred to the light inputted from the back as previously described. Each of the stripes is expanded into a full image, and these images are essentially in register at the output at the front of the lens. Hence, the red spectral component reflected back by one mirror segment, overlays and is in register with the green spectral component reflected by the other mirror segment and with the spectral component reflected by all of the other mirror segments, again ranging potentially from the infrared through the ultraviolet range, to reconstitute an image having multispectral components. This reconstituted image is diverted by beam splitter 1 as an output 20 of the processor and is thereby inputted into focal plane array 15 or other end use element of the associated equipment.

Turning again to segmented mirror 7 and the associated processor 9 and program 11, it was earlier observed that the reflectivity characteristic of the mirror segments are individually controlled by the processor. In its simplest form, the processor comprises a series of switches that provide signals to control the controllable mirror segments to alter the reflectivity characteristic of the segments on an individual basis. The reflectivity characteristic may be controlled to change in level from a very low number or zero, in which essentially no light is reflected, to the highest amount that the mirror is capable of reflecting, sometimes less than one hundred percent. Thus, for example, selecting those mirrors which are spatially located so as to receive and reflect light of the color green and reducing the reflectivity characteristic of those mirror segments to zero eliminates any green components from the image that is reconstituted at the front end of cylindrical lens 3. If the received image in that example was of a red farmhouse on a brown field next to a fully leafed tree containing green leaves and a brown trunk, the image outputted to the focal plane array would not include the green leaves.

FIG. 1a schematically depicts a portion of the embodiment of FIG. 1 illustrating electrical control of the segments of mirror 7', through processor 9' and the program 11' associated with the processor in the simplest form. As earlier described, the mirror segments are the temperature dependent reflectivity characteristics of the Vanadium Oxide family of compounds. Each segment has a heater attached, represented by the resistive heater elements, H1 through H10 so that the level of current through the heater determines the temperature of the thermally coupled VO layer. The program 11' is represented by a series of switches S1 through S10 that are in circuit between a source of current, illustrated as a cell, V, through control processor 9' and extends through the processor to complete the circuit through the heaters to electrical ground. The processor is programmed by operating the switches selectively to the closed position, to allow current to flow and heat the associated mirror segment or remains open, in which case the associated segment remains at ambient temperature. As shown, switches S1 and S4 are open. Hence, the spectra associated with mirror segments one and four cannot be reflected, in as much as the reflectivity of those segments is essentially zero. It is understood that switches may be computer controlled relays or may be electronic switches. Considering again the operation of the embodiment of FIG. 1, it is understood that the light or image is modified to eliminate the spectra associated with the first and fourth segments.

As those skilled in the art appreciate, the "on-off" switches may be replaced by variable resistors in the schematic to represent a variable current level to each segment as controlled by the processor to each, suitably under program control. In the preferred form, control processor 9 is a computerized electronic system having its individual outputs coupled to the control inputs of the mirror segments and the program is a fixed one, representing a known pattern, or a temporary one, containing a spectral pattern which the computer has been trained to recognize. The processor will adjust the level of resistance in circuit; hence, the amount of current applied to the heaters; and, thus, the temperature and reflectivity of the associated mirror segment.

Such arrangement provides for more finely tuned spectral modification of the inputted image or multispectral light source. Suitably the program may be one which is static or fixed in definition as when one desires to recreate a specific spectral arrangement or to eliminate known colors as representative of known "clutter" footprints. The computer in this embodiment has stored or programmed into memory the color "footprint" of the unwanted color. In that event, the processor selects the appropriate current levels to selected mirror segments to eliminate that color from the light. Further, the computer may be issued a command by the human operator to eliminate a certain color or a series of colors. All of the foregoing are rudimentary and involve the use of known computers.

The elements as described may be arranged in a suitable package appropriately supported by various brackets, including appropriate position adjusting devices. Those details are not necessary to an understanding of the novel processor of the invention and are not herein described.

The mirror segments in the combination may contain any form of structure that permits change in the reflectivity characteristic and may contain any number of segments ranging from the few shown to as many as may be practically handled. One example of a controlled mirror is a piezoelectric device, such as a bimorph or a piezoelectric plastic, that is modified to contain a silvered surface. The piezoelectric device possesses the characteristic of bending to a degree, dependent upon the level of applied voltage. As the voltage level is increased, the light from the silvered surface is deflected in another direction away from the grating so that in effect as concerns or appears to the diffraction grating, no light is reflected. The piezoelectric device may be operated between two bistable states, a first state in which there is no deflection and a second one in which the device is fully deflected. Intermediate positions which produce some light reflected to grating 5 are also possible.

The preferred form of adjustable reflectivity characteristic controllable mirror is the one that uses a layer of Vanadium Oxide or similar material, particularly those employing triple component chemistry in which a "dopant" is added to the metal oxide, described in greater detail elsewhere with this specification. A layer of Vanadium Oxide in which the reflectivity characteristic provides a reflective surface as a function of the temperature. By changing the temperature, the amount of light reflected is changed. Thus in the embodiment, the processor supplies each segment with sufficient current to heat the Vanadium Oxide layer to the temperature required to attain the reflectivity desired. It is noted that titanium oxide appears to exhibit similar properties, but those compounds have not been studied to the same degree as oxides of vanadium.

The vanadium oxide transducer takes the form shown in partial section view and to an enlarged scale in FIG. 1b and includes a layer of vanadium oxide 28 in the form of a thin film, typically 1500 Angstroms in thickness, in intimate contact and supported upon one side of a passive, thermally conductive nonmetallic substrate 30, such as glass mica, or sapphire. The substrate is of a flatness that is considered good optical quality, suitably between one-eighth to one-tenth of a wavelength, so as to ensure that the deposited vanadium oxide layer possesses the mirror like quality desired in combination as earlier described. A thin film resistive heating element 32, suitably nichrome or similar high resistivity metal or alloy that is tolerant to elevated temperatures over extended periods, is attached to the opposite side of the substrate and is of a thickness of 1500 Angstroms or thereabout.

The thin films are formed on the substrate by known film forming techniques, such as chemical vapor deposition, chemical vapor transport, and inorganic techniques, the details of which are available in the literature, by first physically depositing the film onto the substrate and then creating the desired oxide order in the deposited film. Process temperature and material purity as those skilled in the art recognize provide for widely different characteristics in the properties of the film, all of which is useful in various embodiments incorporating the invention but which has not to date been fully explored and engineered.

The vanadium oxides represent a broad class of compounds characterized by a large, abrupt and controllable change in electrical resistivity as a function of temperature. In general, members of this oxide family includes $V_2O$, $VO$, and $V_2O_3$ and follow the equation $V(N) O(2N-1)$ for the range $N=3$ through 9.

Above the transition temperature, the electrical properties of the vanadium oxide materials are characteristic of a metal, although the resistivity thereof is often less than the resistivity of metals regarded as good electrical conductors, such as copper. Below the transition temperature the electrical properties are characteristic of a semiconductor. Through doping with impurities and other means the detailed characteristic of the compound are altered to suit specific needs.

The nichrome heater is attached as a film layer to the underside of the supporting substrate by known deposition techniques as earlier discussed in connection with the illustration of FIG. 1b. As illustrated in partial view in FIG. 1c, which shows in an enlarged scale a portion of the segmented mirror structure as viewed from the underside, the nichrome film is simply divided into a plurality of individual heaters, one of which is associated with a corresponding mirror segment, by simply scribing or etching the film into the structure shown. Each of the horizontal series is separated by a cut, a, only one of which is labeled, and the interdigitally arranged vertical cuts, b and c, which extend from opposite sides forms a serpentine current conducting path, such as is represented by the dashed line I, between one end and a common bar, labeled d, between the input and electrical common or "ground". The current allows the nichrome to heat to a temperature that is dependent upon the current level. Since the nichrome layer is very thin, suitably on the order of 1500 Angstroms or less, the thermal generation is very quick, occuring on the order of 50 microseconds or less, and the substrate, being a good thermal conductor, quickly raises the temperature of the associated vanadium oxide mirror segment accordingly, also doing so in a matter of 50 microseconds or less.

The optical qualities of the Vanadium Oxide family of materials, including transmission and reflectivity characteristics and the dependence of those characteristics upon temperature, is described in the technical literature to which the reader may make reference for details. Particular attention may be given to the patent and literature, which follows: Most pertinent is the disclosure in U.S. Pat. No. 4,615,619 to Fateley, granted Oct. 7, 1987, which discloses a spectral filtering arrangement using segmented mirrors, each of which is an oxide of vanadium and is temperature controlled to vary the transmissivity and reflectivity characteristic of the mirror segment and is used in conjunction with a dispersive grating to spatially arrange the individual spectral components of a multispectral light source for application to the segmented mirrors, the arrangement being characterized as a mask, much as in the present invention, although no effort is made to preserve the integrity of the image; and which is employed in a spectroscophy instrument, wherein the light components are focused on a photocell for analytical purposes. Other helpful materials include Y. M. Begishev et al, "Thermomodulation of the Optical Properties of Vanadium Dioxide Films Below the Temperature of the Semi-conductor Metal Phase Transition", Soviet Phys., Solid State, Vol 17, No. 12, 1976, pp 2371-2372; Y.M. Gerbshtein et al, "Features of the Optical Properties of Vanadium Dioxide Films Near the Semi-conductor Metal Phase Transition." Soviet Phys., Solid State, Vol. 18, No. 2, February 1976, pp 290-291; Bugaev et al, "Changes in the Polarization of Reflected Radiation in Phase Transition in Vanadium Oxides." Soviet Tech Phys. Letters, Vol. 2, No. 4, April 1976, pp 130-132; Oleinik et al, "Thermo Chrome Display Based on Metal Semiconductor Phase Transition in Vanadium Oxides.", Inzhenerno-Fizicheskii, Zhurnal, vol. 33, No. 5, pp 931-934, translated by Plenum Publishing Corp.; Valiev et al, "Light Scattering Near the Semiconductor Metal Phase Transition in Vanadium Dioxide." Soviet Phys. Solid State, Vol. 19, No. 9, September 1977, pp 1487-1491; Bugaev et al, "Q Switching of a Resonator by the Metal Semiconductor Phase Transition." Soviet Journal Quantum Electron, Vol. 11, No. 12, December 1981, pp 1638-1639; Bugaev et al, "Selectivity of the Photoexcited Metal Semiconductor Phase Transition in Vanadium Dioxide Initiated by Picosecond Pulses." J.E. T. P. Letters, Vol. 34, No. 8, October 1981, pp 430, 431; Begishev et al, "Light Modulation by Thin Films of Vanadium Dioxide.", Soviet Phys. Tech. Phys, Vol. 24, No. 10, October 1979, pp 1263, 1264.

FIG. 1d presented on the third sheet of the drawings represents a partial view of a piezoelectric bimorph type of element as a controllable light reflector earlier briefly described as may be used to control the reflectivity of the segment in the optical processor, one such device being provided for each segment. The piezoelectric 30' is controlled by electric voltage applied across leads 28' and 32' and with a sufficient voltage applied bends, as illustrated in dash line, to move the end sivered mirror surface 31' away from the aperture in mask 29' to reduce the amount of light reflected back toward the light source.

The processor of FIG. 1 provided whole scene modification of the spectral content of a received multispectral image or light source by performing the processing along one axis. In the processor illustrated in symbolical form in FIG. 2, the spectral component modification is accomplished along both the X or horizontal and Y or vertical axes of the received image. Effectively, the processor of this embodiment contains dual optical processor. For ease of understanding, the elements which appear in this embodiment that are the same as the elements found in the embodiment of FIG. 1 are identically labeled. Moreover, the elements of the second processor which are illustrated are given the same identifying numerals and are primed. Thus, a second beam splitter 1', which is of identical construction to beam splitter 1, and a processor 2', which is identical in all respects to and contains the same element of processor 2, are added and the control processor is coupled to the mirror segments, not illustrated, in processor 2'. In the embodiment of FIG. 1, the reconstituted image was outputted to focal plane array 15. However, in this embodiment, the reconstituted image is inputted into the second beam splitter which passes that image into processor 2' which operates on and modifies the spectral content along the horizontal axis of the image under control of processor 9 and in turn produces a reconstituted image. More accurately, the doubly reconstituted image traveling toward beam splitter 1' which in turn diverts this doubly reconstituted image to the input of focal plane array 15.

The processor embodiment symbolically illustrated in FIG. 3 employs both horizontal and vertical polarizing filters in a dual processor system. This allows separate spectral filtering of the two different polarization components of the scene. Since the elements in this embodiment are essentially the same as in the embodiment of FIG. 2, the identical elements are identically labeled and need not be described in detail or the detailed theory of operation repeated. In this system a polarizing filter 34 is added to the input end of the cylindrical lens in the horizontal or x axis spectral modifying processor 2; a second polarizing filter 34' is added to the front end of the cylindrical lens in the vertical or y axis spectral modifying processor 2'. Further to minimize components, only a single splitter 36' is used, serving as illustrated as the input to both spectral filter sections. If desired a separate splitter may be used for each section as in the prior embodiment. The system converts the horizontally polarized spectral components to the spacial distribution form and then reconverts to the multispectral image form, as modified according to the program. This reconstituted image is similarly again modified along the vertically polarized axis from whence the doubly reconstituted image is outputted to a focal plane array.

A surveillance system employing the novel processor for optically processing the received image to eliminate distracting clutter is illustrated in block diagram form in FIG. 4. This includes a telescope 31, optical processor 33, which may consist of any of the aforedescribed embodiments, a focal plane detector array 35, electronic image processing apparatus 37, and display apparatus 39, appropriate cooling subsystem 41 and control apparatus 43 for controlling the orientation of the telescope. The elements are incorporated in a self-contained arrangement preferably as part of a land based or air or space based optical telescope system. In the later event, the display 39 is not directly connected with the electronic processor 37 but is coupled via suitable radiotelemetry links. The details of the elements; a part from the novel elements described herein, are known and are not necessary to the invention.

With an understanding of the operation of the spectral filter and the surveillance system, additional systems which incorporate the structure for the filter, are presented simply in block diagram form so as to provide clear illustration without unnecessary detail or boring repetition. Thus FIG. 5 illustrates a communication system in which the carrier is a multispectral light beam having the constituent spectral components modulated, providing a multi-channel carrier with little cross channel interference.

In this a multi-spectral light source, LS, such as an incandescent source, is input to the spectral filter, SF. A plurality of modulators, represented as M1 through M4, provides then ac signals, representing the modulation, are coupled to corresponding mirror segments in spectral filter SF, serving as the control signals for the mirror segments. Each modulation source serves to modulate the temperature, hence the reflectivity of the associated mirror segment. In turn this varies the associated spectral component associated with the mirror segment in the manner as earlier described in connection with the preceeding embodiments. The recombined spectral components are outputted as a multispectral light, represented as gamma mm, and this light travels through space or fiber optic cable and is received at the receiving station RC. At this remote station a grating or similar element separates the total spectrum, allowing it to fall onto a one dimensional array of photodetectors. Appropriate detectors monitor each spectral component and demodulate the signal and pass the information to the output, represented as loudspeakers L1 through L4 in the figure.

In other applications, a menu of colors is stored in the computer. When the operator wishes to display a certain color, he selects one from the menu and issues the command as controlled by software allowing the computer to appropriately alter the current applied to the selected segments so that the light outputted will be of that selected color. This has use in scientific and educational application for accurately identifying colors as a test/simulation laboratory source having unique and selectable spectral characteristics and even in stage lighting.

A source of programmed light is presented in FIG. 6. In this combination a source of multispectral light LS inputs the light, gamma m, to the spectral filter, SF, in which the light is modified according to the control signals inputted to the filters mirror segments by control processor CP. The control processor has been preprogrammed to allow selection of various colors and hues so that the operator need only hit the proper selector button or input the appropriate command, such as color "violet". The modified light outputted, represented as gamma mm is applied to a screen such as represented as GC and is viewed by the operator. If the colored light generator is used as a color matching device, the operator determines whether the color selected matches that of the item whose color is to be determined, represented at OC. If it does not match the operator trys again, selecting other colors on the control processor.

More sophisticated programs may be installed. For example, by mapping and digitizing a representation of a stage, the entire stage area may be displayed on an operators CRT display. Given one of the conventional light pen controlled CRT terminals, the operator may select a particular area of the screen to spot with a particular color.

In as much as the entire stage is flood with light, the spot or picture that overlies the stage with white light, for example, is changed to add an orange colored "object" or spot at a particular location. In short, the color or spot is introduced to the field of view, which is the reverse of the clutter removal feature described in connection with earlier embodiments.

It is believed that the foregoing description of the preferred embodiment of the invention is sufficient in detail to enable one skilled in the art to make and use the invention. However, it is expressly understood that the details of the elements which are presented for the foregoing enabling purpose is not intended to limit the scope of the invention, in as much as equivalents to those elements and other modifications thereof, all of which come within the scope of the invention, become apparent to those skilled in the art upon reading this specification. Thus the invention is to be broadly construed within the full scope of the appended claims.

What is claimed is:

1. Image processor apparatus for processing and spectrally modifying an optical image received at an input to a spectrally different image at an output, comprising:
   light splitter means for passing incident light traveling in a first direction and for reflecting incident light traveling from a second direction, opposite to said first direction;
   optical lens means responsive to light passed by said splitter means traveling in a first direction for condensing said light image into a stripe and responsive to a light stripe traveling in a second direction, opposed to said first direction, for enlarging said stripe into a larger light image;
   dispersing means responsive to said incident stripe of light produced by said optical lens means for dispersing said light stripe into a plurality of spectral components, each of said spectral components being in the form of a stripe and each traveling from said dispersing means at a different angle with respect thereto;
   mirror means, said mirror means having a series of individual mirror segments spaced from one another over a predetermined area;
   each of said segments having a reflectivity characteristic that is adjustable in level responsive to the level of a control input applied thereto;
   said mirror means being positioned to receive said spectral light components from said dispersing means, different ones of said spectral light components being incident upon different individual ones of said mirror segments and for attenuating and reflecting said incident spectral components back to said dispersing means;
   control means for individually controlling the reflectivity of each of said mirror segments to permit said segments to possess different reflectivity and thereby control the level of spectral components within the light reflected by said mirror means;
   said dispersing means being further responsive to said return light stripes reflected from said mirror means for reflecting said return stripes in a second direction of travel to said optical lens means, and said lens means enlarging said reflected stripes and registering such enlargements into a larger multispectral image representative of said input image, whereby the spectral components of the image formed by said reflected light may be different from and eliminate certain of the spectral components of said light stripe formed by said optical lens means.

2. The invention as defined in claim 1 wherein said dispersing means comprises an optical grating means.

3. In a surveillance system, the improvement comprising:
   means for receiving a visible multispectral image of a field of view, said image containing desired object images and clutter images and being formed of a plurality of spectral components of different wavelengths within the spectrum range of infrared to ultraviolet; and image processing means for processing said image to provide an output image containing essentially only said desired objects;
   said processing means, including:
   first means for separating said image into a plurality of separate constituent spectral components and spatially dispersing said separate spectral components simultaneously over a predetermined area, with the highest wavelength spectra located at one end of said area and the lowest wavelength spectra thereof at the opposed end of said area and with the intermediate ones of said spectral components spaced therebetween;
   second means for selectively modifying individual ones of said spectral components to individually and selectively reduce the intensity of one or more of said spectral components representative of said clutter image and for outputting said spectral components, including said modified spectral components;
   third means responsive to said output of said second means for reconstituting said spectral components into a visible image of said field to produce an output image different than said input image, whereby certain of said spectral components representative of said clutter image are eliminated;

4. In an optical image processor having means for modifying the spectral components within the received light image for providing an image having different spectral components, the improvement comprising:
   means for dispersing a received light image into its constituent plurality of spectral components of different wavelengths dispersed at different angles and spatially distributed over a predetermined area;

a plurality of reflecting means spatially distributed over said area and occupying portions thereof for receiving, attenuating and reflecting each of said spectral components; means coupled to said reflecting means for controlling the intensity of the reflection of each of said reflecting means, whereby the spectral components are modified to provide an image of spectral constituency different from the input image.

5. The invention as defined in claim 4 wherein said reflecting means comprises:
a layer of material having a mirrored surface capable of reflecting light, said material having a controllable reflectivity characteristic.

6. The invention as defined in claim 5 wherein said material comprises a material selected from the class of vanadium oxide compounds, said compounds having a reflectivity characteristic functionally dependent upon the temperature; and further comprising:
a substrate supporting said material on one side;
electrical heater means coupled to said substrate responsive to current for heating said substrate;
said substrate being thermally conductive and electrically insulative for transfering heat from said heater means to said material.

7. The invention as defined in claim 6 wherein said heater means comprises the material nichrome.

8. The invention as defined in claim 6 wherein said material is of a thickness no greater than 1500 Angstroms.

9. Optical Processor means for receiving a multispectral light image at an input and providing a spectrally modified image at an output, comprising:
input means for receiving a light image;
means coupled to said input means for dispersing said received image into a constituent plurality of spectral components and distributing said plurality of spectral components over a predetermined area;
means located in said area responsive to said spectral components located in said space for modifying at least one of said spectral components and for reflecting said spectral components, including modified spectral components, to a common plane in essentially overlapping registered relationship to reconstitute a multispectral image; and output means for outputting said reconstituted image from said common plane.

10. The invention as defined in claim 9 wherein said light modifying means comprises:
a plurality of light reflecting segments of adjustable reflectivity spaced side by side, said reflectivity level being controllable;
said segments being oriented to reflect light incident thereon to a common plane with the light reflected from each segment being in register at said common plane;
each said segment providing a light reflectivity characteristic level dependent upon a control signal at an input; and
control means for individually controlling the reflectivity of each segment.

11. The invention as defined in claim 10 wherein said segments each comprise:
a layer of Vanadium Oxide compound.

12. The invention as defined in claim 10 where said segments each comprise:
piezoelectric bimorph means; and a layer of light reflecting material on said bimorph means.

13. The invention as defined in claim 11 further comprising:
heater means coupled to said Vanadium Oxide compound; and wherein said control means is coupled to said heater means for supplying heater current thereto.

14. The invention as defined in claim 10 wherein said control means includes computer means, said computer means containing a program for supplying control signals prescribed by said program.

15. The invention as defined in claim 10 wherein each of said segments comprise an oxide of vanadium having the formula V(N)O(2N-1),
where N is in the range of N=3 through 9.

16. The invention as defined in claim 10 wherein said control means comprises: a plurality of modulator means, each said modulator means being associated with a corresponding one of said mirror segments for modulating the temperature of the associated segment.

17. The invention as defined in claim 16 further comprising in combination therewith light receiver means spaced from said optical processor means for receiving light outputted from said processor means, said receiver means containing means for detecting individual spectral components within the received light, means for demodulating said detected spectral components, and means for outputting demodulated signals.

18. The invention as defined in claim 10 wherein said multispectral light image is an image of a single white light source.

19. The invention as defined in claim 11 wherein said compound is an oxide of vanadium having the formula V(N) O(2N−1),
where N is in the range of N=3 through 9.

20. In a surveillance system for monitoring objects within a field of view that presents an image containing objects distinguishable from one another by having different spectral attributes, the improvement comprising:
first and second image processor means for processing and spectrally modifying an optical image received at an input to a spectrally different image at an output;
said first image processor means for modifying said image along a first axis and said second image processor means for modifying said image along a second axis perpendicular to said first axis;
and means for coupling the output of said first image processor means to the input of said second image processor means to provide an output image processed along two axes;
and wherein each of said image processor means comprises:
light splitter means for passing incident light traveling in a first direction and for reflecting incident light traveling from a second direction, opposite to said first direction;
optical lens means responsive to light passed by said splitter means traveling in a first direction for condensing said light image into a stripe and responsive to a light stripe traveling in a second direction, opposed to said first direction, for enlarging said stripe into a larger light image;
dispersing means responsive to said incident stripe of light produced by said optical lens means for dispersing said light stripe into a plurality of spectral components, each of said spectral components being in the form of a stripe and each traveling from said dispersing means at a different angle with respect thereto;

mirror means, said mirror means having a series of individual mirror segments spaced from one another over a predetermined area;

each of said segments having a reflectivity characteristic that is adjustable in level responsive to the level of a control input applied thereto;

said mirror means being positioned to receive said spectral light components from said dispersing means, different ones of said spectral light components being incident upon different individual ones of said mirror segments and for attenuating and reflecting said incident spectral components back to said dispersing means;

control means for individually controlling the reflectivity of each of said mirror segments to permit said segments to possess different reflectivity and thereby control the level of spectral components within the light reflected by said mirror means;

said dispersing means being further responsive to said return light stripes reflected from said mirror means for reflecting said return stripes in a second direction of travel to said optical lens means, and said lens means enlarging said reflected stripes and registering such enlargements into a larger multi-spectral image representative of said input image, whereby the spectral components of the image formed by said reflected light may be different from and eliminate certain of the spectral components of said light stripe formed by said optical lens means.

21. The invention as defined in claim 20 wherein said control means of each of said first and second image processor means are coupled together to place them under common control

* * * * *